E. HOPKINSON.
MACHINE FOR BUILDING PNEUMATIC TIRE CASINGS.
APPLICATION FILED APR. 24, 1918.
1,310,701.
Patented July 22, 1919.
2 SHEETS—SHEET 1.
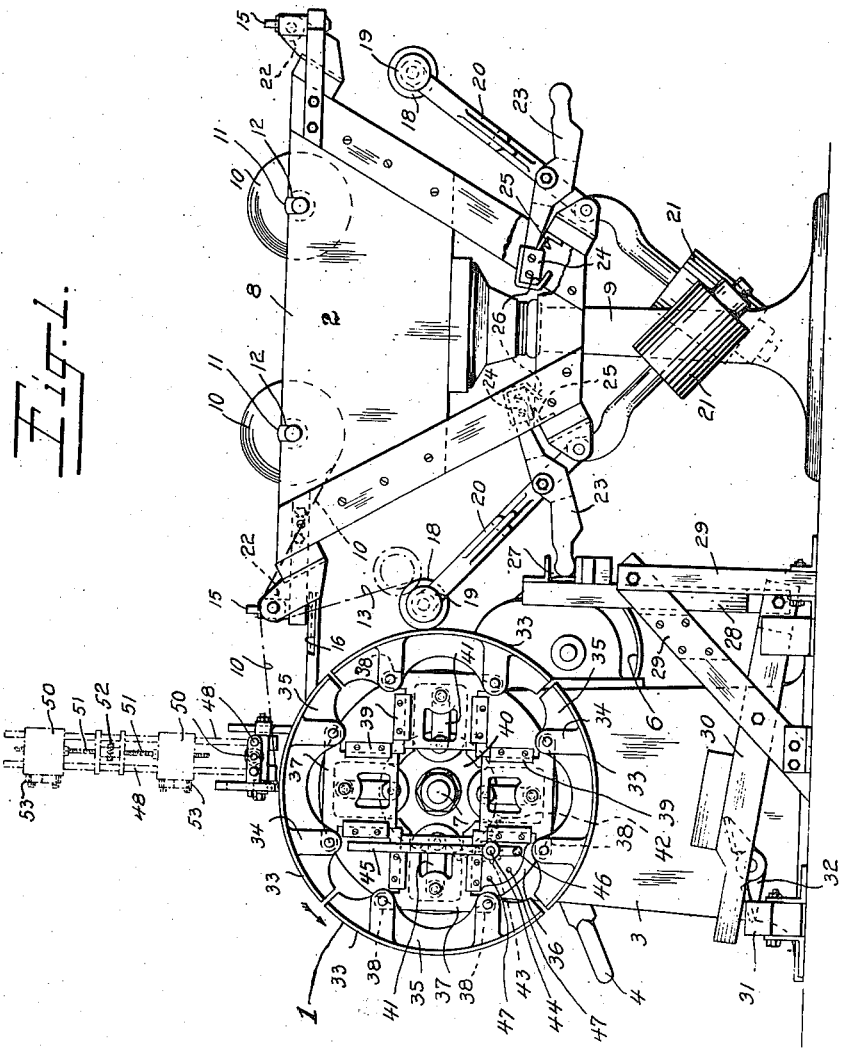
Inventor
Ernest Hopkinson

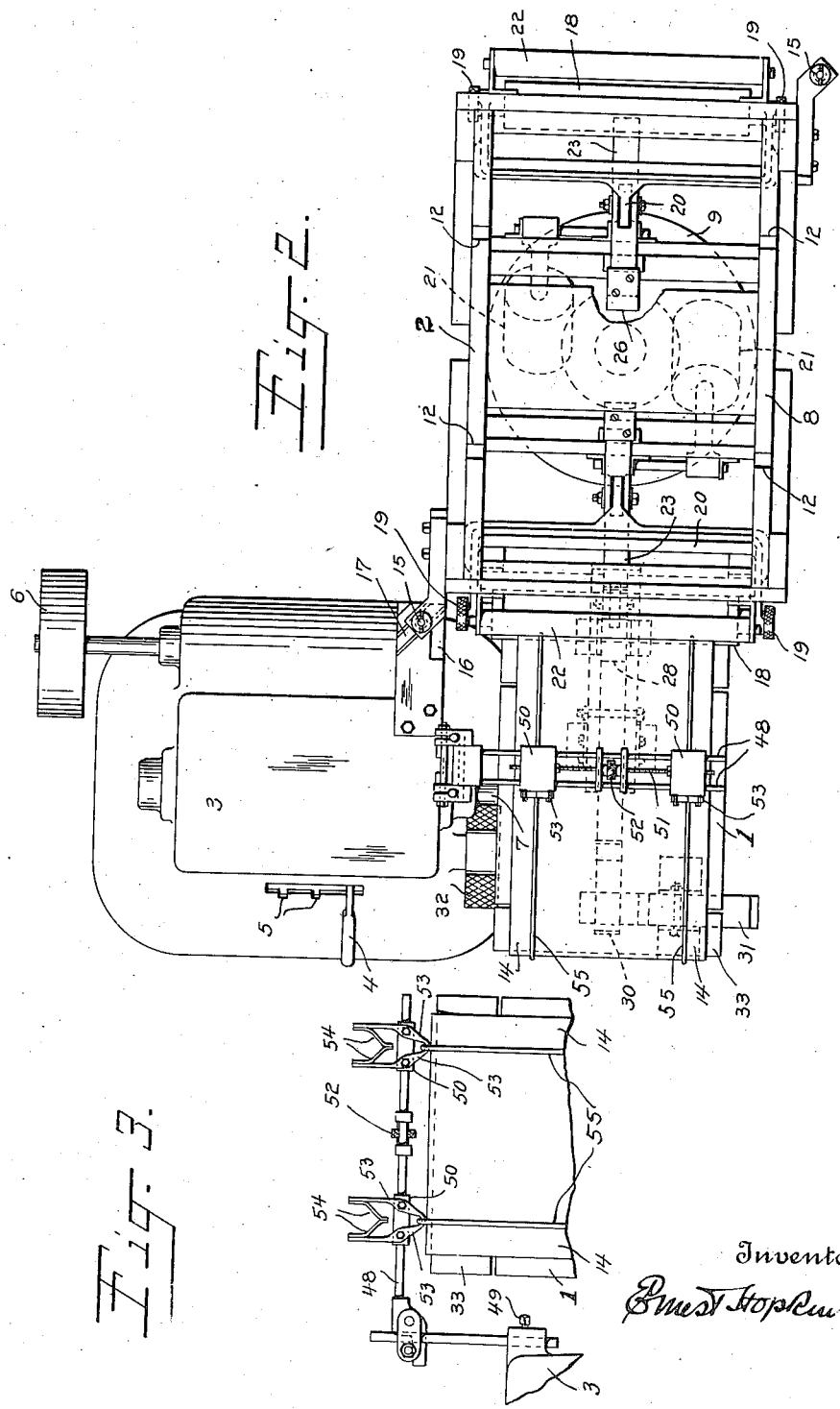

UNITED STATES PATENT OFFICE.

ERNEST HOPKINSON, OF NEW YORK, N. Y.

MACHINE FOR BUILDING PNEUMATIC-TIRE CASINGS.

1,310,701. Specification of Letters Patent. Patented July 22, 1919.

Application filed April 24, 1918. Serial No. 230,547.

*To all whom it may concern:*

Be it known that I, ERNEST HOPKINSON, a citizen of the United States, residing in New York city, county and State of New York, have invented certain new and useful Improvements in Machines for Building Pneumatic-Tire Casings, of which the following is a full, clear, and exact description.

This invention relates to machines for use in building pneumatic tire casings and is more particularly directed to the building of the type of casing wherein the parts comprising the casing are first wholly or partially assembled and the edge portions given definite size after which the intermediate portion is expanded outwardly to impart to it the required tire shape, and the machine involving the present invention is intended to accomplish the first of these steps, namely, building the casing or a portion thereof up to a point where it is ready to be expanded into tire shape.

An object of the invention is to provide a support for plying up the various layers of rubber and rubberized fabric in flat or comparatively flat pulley band shape, that will easily permit of the removal of the built-up band for further treatment by other apparatus, such for instance as the expanding or tire shaping apparatus.

Another object is to convey the material from a source of supply to the building drum or support in a manner to prevent any harmful stretching of the material.

A further object is to provide a support for the material comprising the casing that will support the edge portions in substantially flat shape to facilitate the formation of the edges of the casing to substantially their final shape.

A still further object is to provide means that will permit of outwardly acting radial pressure being applied to the material comprising the casing at the edge portions in order to bind the plies of material and confining rings together with sufficient force to assist in holding the rings in place while the material is being turned upon them.

A still further object is to provide means for definitely positioning the bead rings, cores, etc., relative to each other and to the edges of the casing.

With these and other objects in view, which will readily appear as the nature of the invention is better understood, the same consists in the novel construction, combination, and arrangement of parts hereinafter more fully described, illustrated and claimed.

Referring to the drawings forming a part of this specification:—

Figure 1 is a side elevation of a machine partly broken away.

Fig. 2 is a plan view of the machine partly broken away, and

Fig. 3 is a view in detail of the bead positioning means.

The machine, in its preferred embodiment, comprises three main features, namely, the mechanism, for simplicity termed the building drum, indicated at 1 for assembling and supporting the tire structure in the flat pulley band shape; the source of stock supply indicated at 2; and the driving means indicated at 3.

The driving means is primarily for revolving the building drum and may be of any desired type. In the present instance, it is shown provided with a speed controlling arm 4 which may be moved into any one of the various grooves 5 for changing the speed of the drum, in any desired or well-known manner. The driving mechanism may be driven in any desired manner as by means of the pulley 6 which may be connected with any source of power desired. It is provided with a main shaft 7 upon a laterally extending portion of which the building drum is mounted.

The source of stock supply comprises a frame 8 mounted on a post 9 and to facilitate speed in manufacturing, a plurality of stock supply units may be used, two being shown in the present instance identical in construction so that a description of one will suffice for both. While the stock at one supply unit is being used for building the flat pulley band structures, the other supply unit may be replenished with stock for future use. Accordingly the frame 8 is mounted to revolve upon the post 9 so that the two units may in turn be brought respectively to and from the building drum.

The stock indicated at 10 is preferably wound upon a core or spool 11 and in this shape supplied to the machine. The frame 8 is provided with open bearings 12 for receiving the reduced extended ends of the stock spool, thus providing a ready means for the insertion and removal of the spools as occasion requires. The stock is wound upon the spool with a liner strip 13 in the usual manner to prevent adhesion of the green rubber on the successive convolutions of the strips of tire material. While my invention is not confined to the use of any particular kind of material or any particular manner of preparing it, I prefer, in the present instance, to describe the machine in connection with a tire built of plies of rubberized cord fabric. The cord fabric is usually cut in strips on the bias and secured in lengths sufficient to pass once around the building drum to form a ply of the tire, and the direction of the cords is reversed in the successive plies so that they will alternately cross each other. Moreover, where it is desired to fold the edges over, as is done in certain types of tires, the successive plies may be cut to slightly varying widths in order that the edges denoted at 14 when turned about the bead rings will present a neat appearance.

The plies of material when suitably prepared are reeled upon the spool, with the liner strip, in the proper order to enable them to be fed consecutively therefrom to the building drum to construct the desired flat pulley band. That is to say, the spool of material comprises sets of strips, each one of which will constitute a tire casing or any desired portion thereof when assembled on the building drum. The strips of each set are of suitable lengths to form single plies in the casing, and the strips are suitably placed in reeling them so that they will be fed from the reel in the desired order. The frame 8 when turned about the post 9 is locked in operable position by means of a spring-pressed pin 15 secured thereto having a lower end adapted to ride up an incline 16 and automatically snap into locked position in the groove 17, the incline and the groove being shown for convenience formed on a plate which is secured to the frame of the driving mechanism 3. All that is necessary in releasing the frame 8 is to lift the pin 15 clear of the groove when the frame will be free to turn about the post thereby conveying the supply spools to and from operable position, or if desired the groove 17 may be provided with an inclined side wall over which the pin 15 may be forced to ride by simply turning the frame 8. A take-up roll 18 for the liner strip 13 is detachably mounted, by means of the draw pins 19, in the bifurcated end of a lever 20, positioned to bear upon and to be driven by the building drum. The lever is fulcrumed to the frame 8 and is provided at its lower end with an adjustable counterweight 21 to regulate the pressure of the roll against the building drum. A guide roll 22 is mounted on the frame 8 to assume a position between the drum and stock roll when in operable position and serves to guide the plies of rubberized fabric in their passage to the drum. The stock reel is so disposed in the frame that the stock and liner strip will be led from the bottom thereof, with the liner strip below the rubberized fabric stock as clearly shown in Fig. 1. The liner strip thus serves as a support and conveyer for the fabric in its passage between the stock reel and guide roll 22, and as the roll 18 is positively driven through contact with the building drum it positively draws the liner strip 13 and thereby provides a drive for turning the stock reel. This prevents any tension whatever being placed upon the rubberized fabric plies of material as they are being fed to the drum. This is an important feature, especially where cord fabric is employed. This fabric is composed of warp cords placed closely together in parallelism with weak woof threads placed at considerable distances apart intended only for temporarily holding the warp threads together. This fabric is easily stretched and, as the plies are cut to the required length to pass once around the drum, if stretching is permitted, the surplus length would present a waste that would have to be cut away when the butt joint at the ends of the strip was made. Moreover, stretching would alter the width of the strip, or separate the cords leaving less fabric in the tire either of which conditions is undesirable.

The natural tendency of the roll 18 is to gravitate and to prevent this when it is swung to inactive position about the post 9, a latch and controlling mechanism is provided which also serves to cut out the roll 18 from operative engagement with the building drum after the fabric has been laid on the drum. This mechanism comprises a lever 23 fulcrumed to the lever 20 and provided at its latching end with a catch 24 which may be brought to engage a lip 25 secured to the frame 8, in which position the roll 18 is positively held in raised position. A second hook 26 is also provided to engage the lip 25 should the first hook be accidentally released. The outer or control end of the lever 23 is adapted to engage a groove 27 provided on the upper end of a lifting bar 28 slidably secured near its upper end in the supporting frame 29 and pivoted at its lower end to a controlling treadle 30 fulcrumed on the frame 29. By pressing the free end of the treadle 30, the roll 18 will be raised or swung rearwardly as will also the lever 23 until the catch 24 engages with the lip 25. The roll 18 is thus cut out of operation which will be desirable after the fabric has been laid on the drum and while the bead rings, cores or the like are being placed in position and the edges of the fabric turned over, or otherwise shaped to form the edges of the tire as will later more fully appear. Moreover, the frame 8 may be turned about the post 9 while the roll 18 is held in raised position. During this movement, the lever 23 of the unit in action leaves the groove 27 and the free end of the opposite lever is moved into the groove. To facilitate this, the treadle 30 is counterweighted to permit the groove 27 to be normally raised in registering position with the ends of the levers 23 when in locked positions. In order to release the catch 24 to permit the roll 18 to engage the building drum, a second treadle 31 is provided. This is fulcrumed at right angles to the treadle 30 and has one of its ends positioned beneath the outer end of the treadle 30 for raising same when its opposite end is depressed. This will effect a lowering of the groove 27 and releasing of the catch 24, thereby permitting the roll 18 to drop into frictional engagement with the building drum.

The building drum is detachably mounted on the shaft 7 to revolve therewith and a treadle 32 connected with the driving mechanism, is provided which may be swung in either direction for starting and stopping the drum as desired. Moreover, the movement of the arm 4 into one of the grooves 5 may be utilized to operate the driving mechanism (not shown) to release the shaft to permit the building drum to be rotated independently of the driving mechanism in either direction. Any well-known means may be employed for this purpose and further description thereof is therefore not deemed necessary.

The building drum is made in sections to permit of its being expanded and contracted, four sections being employed in the preferred embodiment. The mechanism employed for expanding and contracting the sections is similar on both ends of the drum and therefore a description of the mechanism at one end will suffice. The drum is composed of the skeleton-like cylindrical quadrants 33 provided with pairs of inwardly projecting lugs 34 connected by stiffening webs 35. A relatively thick disk or plate 36 is secured to the shaft 7. The disk is provided with grooves or channels in which are slidably mounted the plates 37 having lugs 38 pivotally secured to the lugs 34, whereby any movement of the plates 37 will impart a corresponding movement to the drum sections pivoted thereto so that when all the plates 37 are moved simultaneously inwardly or outwardly there will be a corresponding contraction or expansion of the building drum. Plates 39 are secured to the disk 36 to overlap the plates 37 to retain them within their respective grooves.

To operate the plates 37, a disk 40 is loosely mounted on the shaft 7 and the several plates 37 are secured thereto by means of links 41. A segmental gear 42 is formed on the disk 40 and a pinion 43 in engagement with the segmental gear is mounted on a shaft 44 journaled in the disk 36. The shaft 44 passes entirely through the drum to serve as a shaft for the companion pinion at the opposite end so that when the shaft 44 is actuated both pinions will be driven, thereby effecting a simultaneous movement on both pairs of mechanisms above described situated at each end of the drum. A single lever 45 is provided for operating this shaft. The lever is secured to the shaft at the outer end of the drum to place it in easy reach of the operator and its lower end is provided with a spring-pressed pin 46 which is adapted to engage any one of a series of depressions 47, formed in a plate secured to the disk 36, when the lever is turned to bring the pin in registering position therewith. Three of these depressions are shown and they denote the three principal positions of the drum, namely, the positions of greatest contraction, medium position, and greatest expansion. The engaging end of the pin may positively lock the parts or it may be made round at the end as may also the depressions so that the former may ride in and out of the latter when the lever is swung without the necessity of manually withdrawing the pin.

It will readily be seen that by operating the lever 45 in either direction, the disk 40 will be given a partial turn, thereby imparting a simultaneous swinging and longitudinal movement of the links which thereby transmits a longitudinal movement to the plates 37 and consequently a corresponding movement of the drum sections 33, the last mentioned movement being inwardly or outwardly depending upon the direction of movement of the lever 45.

The device for positioning the confining bead rings comprises a supporting frame 48 secured to the frame of the driving mechanism 3 in vertically adjustable position by means of the set screws 49. The frame comprises vertical and horizontal members pivotally secured together to permit the horizontal member to be swung away from the building drum when not in use as shown in dotted lines in Fig. 1.

The horizontal arm of the frame carries a pair of blocks 50 mounted to slide thereon and connected together by a right and left threaded screw 51 upon which is secured a hand-operated wheel 52 disposed in an opening in the frame to prevent longitudinal movement of the screw. A pair of claws 53 is pivotally secured to each of the blocks 50. The claws are adapted to pass under the bead rings 55 and are provided with the springs 54 to produce a spring-pressed engagement of the claws with the bead rings. The claws thus serve to grip the bead rings from their inner circumferences and will slightly raise them from the plies of fabric on the drum to better serve as guides in positioning the rings.

It will be noted that while the claws grip the rings from within, their two members form a groove for the bead of sufficient width to permit the bead to freely move therethrough as the building drum is revolved. It will thus be seen that the rings may be accurately positioned by gripping them with the claws and then revolving the drum so that all points of the rings will be passed through the fixed grooves provided by the claws, thereby correcting any lateral displacement of the rings. It will also be noted that by turning the wheel 52, the claws may be moved at equal distances outwardly or inwardly to adapt them for different sized tires, and also that the building drum may be easily removed from the shaft 7 by first removing the retaining nut provided thereon and a drum of a different size substituted, in which case the bead ring positioning means may be vertically adjusted to accommodate the claws to the size of the drum employed.

The operation of the machine is as follows:—

As before remarked the building drum may be employed for building any of the various types of tire casings, such for instance as the clencher, quick detachable, etc. In tires of the clencher type a bead or core of relatively hard rubber is usually disposed between the plies at the edge portions and the plies below the bead or core and those above meet at their extreme edges. In tire casings of the quick detachable type, after several plies have been assembled confining bead rings are placed about them and the edges of the plies are turned over upon the rings, after which other plies of the material may be added, and while the bead positioning means may be employed in the building of any of the various types of casings, for simplicity I will describe the operation of this feature of my invention more particularly in connection with the quick detachable type of tire.

The tire casing material having been suitably prepared and reeled with a liner strip into a roll as already described, is placed in the bearings of frame 8 at the right and the frame given a half turn to bring the material opposite the building drum. In this position the latch 15 having advanced up the incline 16 automatically snaps into the groove 17 and locks the frame in position. It will be understood that the roll is so placed in the bearings that the liner strip and material passes from the bottom of the roll during the building operation. The liner strip with the plies of tire casing material supported thereon is passed over the roll 22 and brought down and around the take up roll 18 while the rubberized fabric plies are led directly from the roll 22 to the building drum. The free end of the treadle 31 is depressed thereby releasing the latching mechanism and permitting the roll 18 to ride upon the building drum. The building drum is preferably set to its intermediate diameter by suitably turning the lever 45 and then revolved either by hand or power. In the former instance, the arm 4 is placed in the particular groove 5 that will result in freeing the drum from the driving mechanism, while in the latter instance, the arm 4 is preferably placed in the groove which will result in driving the drum at slow speed. As the drum is turned the roll 18 will be frictionally driven thereby and the liner strip 13 reeled about the roll while it simultaneously conveys the plies of fabric to the building drum without in any way pulling or stretching the fabric. The first ply of fabric is thus laid upon the drum and its ends connected together by a butt joint. If the operator wishes to revolve the drum for the purpose of inspecting the ply or otherwise, the roll 18 is cut out of operation by depressing the treadle 30 which effects a locking of the catch 24 with the lip 25.

The operation thus described is repeated for the several plies and when the desired number of plies have been built upon the drum, the drum is contracted by means of the lever 45 and the confining bead rings 55 placed upon the end portions of the plied-up structure. The bead ring positioning means having been adjusted to the right height by means of the set screw 49 to correspond to the particular building drum used, the swinging portion of the frame 48 is lowered to horizontal position and the claws 53 operated to grip the rings. The rings are thus slightly raised from the plied-up tire casing material, but the claws provide a sufficiently wide groove to facilitate the free passage of the rings therethrough.

The drum in its contracted position loosely holds the material and rings together thereby permitting the easy positioning of the rings upon the material. To accomplish this, the drum is turned until all parts of the rings have passed through the grooves thereby insuring their accurate positioning. The rings are then released from the claws and the supporting arm swung back out of the way. The drum is then expanded by suitably turning the lever 45 thereby pressing the tire casing material firmly against the rings with a sufficient force to hold the rings in place when the edges of the material are turned thereabout. The drum is held in this expanded position through the instrumentality of the locking pin 46 and corresponding receiving depression 47. In the building of a quick detachable type of casing the edges of the material may then be turned over in any suitable manner, the drum being preferably placed at high speed for this purpose. After the edge portions of the tire have been thus formed other plies may be added as may also the usual breaker strips, chafing strips, tread, rubber side walls, etc.

The tire casing, or a portion thereof as the case may be, is thus constructed in flat pulley band shape with the edges completed to substantial tire dimension, and in this form is removed from the drum which is again contracted to facilitate this. The flat pulley band structure is then subjected to the action of other machines, such for instance as the apparatus which effects the expansion of the portion intermediate the edges, after which the casing is finally vulcanized in any usual or preferred manner.

The confining bead rings 55 are usually made of several convolutions of wire covered with rubber coated spirally wound strips of fabric. My invention however is not confined for use with any particular type of tire or style of confining means, but may be employed in building any style of tire whether of the quick detachable, clencher, or plain sided type, and whether wire rings, rubber strips or other devices be employed at the edges for wrapping the fabric plies thereabout.

It will be noted that in building tire casings according to my invention after the casing has been removed from the building drum, it is given complete tire shape during which operation the edge portions are turned through an angle substantially of 90° and when I refer in the appended claims to "flat endless edge portions of tire casing" material and similar terms, such as "flat cylindrical drum", "flat cylindrical surface", "flat transversely for a width" etc., it is to be understood as referring to edges of the casing in their flattened or spread out condition previous to the position they assume when turned through substantially a 90° angle to their final tire position, and to apparatus that has the flattened feature in the sense that the tire edges are formed upon a supporting surface of a horizontal nature, for it is obvious the parts need not be absolutely flat except in the sense that they provide means for producing a pulley band that is capable of later being distended throughout its central portion and having its edges moved in to final tire position.

As many apparently widely different embodiments of the invention may be made without departing from the spirit thereof, it is to be understood that I do not intend to limit myself to the specific form of embodiment of the invention herein described.

Having thus described my invention what I claim and desire to protect by Letters Patent is:—

1. A machine for forming a multi-ply flat pulley band comprising a support having an outer contractible cylindrical wall for applying the material directly thereupon, said wall being formed flat transversely for a width sufficient to support the bead portions of the flat band upon its flat outer circumference, and means adapted to contract the cylindrical wall from its band building position while the band is supported thereon.

2. A machine for forming a multi-ply flat pulley band comprising a frame, a support revolubly mounted upon the frame and having an outer cylindrical wall for applying the material directly thereupon, said wall being formed flat transversely for a width sufficient to support the bead portions of the flat band upon its flat outer circumference, and means adapted to contract the cylindrical wall from its band-building position while supported on the frame and while supporting the band to facilitate applying the beads thereupon and for expanding the wall from its bead receiving position for pressing the material beneath the beads into intimate contact therewith.

3. A machine for forming a multi-ply flat pulley band comprising a frame, a support revolubly mounted upon the frame and having an outer cylindrical wall for applying the material directly thereupon, said wall being formed flat transversely for a width sufficient to support the bead portions of the flat band upon its flat outer circumference, means for expanding the said cylindrical wall from its bead-receiving position for pressing the material beneath the beads into intimate contact therewith, and means for locking the wall in said expanded position.

4. In a tire building machine a sectional cylindrical drum for building a flat pulley band thereupon, said drum being flat transversely for a width sufficient to support the bead portions of the band upon its flat outer circumference, a guide mounted adjacent the outer circumference of the drum in sufficiently close proximity thereto to directly engage the bead ring and guide same in a direction transversely of the drum to a predetermined position upon the band, and means for expanding the drum from its bead-receiving position for pressing the material beneath the bead into intimate contact therewith.

5. In a tire building machine a sectional cylindrical drum for building a flat pulley band thereupon, said drum being flat transversely for a width sufficient to support the bead portions of the band upon its flat outer circumference, a positioning guide for the bead ring disposed adjacent the outer circumference of the drum, means for producing relative movement between the guide and drum, and means for expanding the drum from its bead-receiving position for pressing the material beneath the bead into intimate contact therewith.

6. In a tire building machine a cylindrical drum for building a flat pulley band thereupon, said drum being flat transversely for a width sufficient to support the bead portions of the band upon its flat outer circumference, means adjacent the outer flat surface of the drum for guiding a bead laterally of the said surface, and means for positioning the guiding means relative to the drum for accommodating it for drums of various sizes.

7. In a machine of the character described, means for supporting a flat endless edge portion of tire casing material and its accompanying bead ring mounted thereon, and positioning means for guiding the ring and holding same away from the material, one of said means being mounted to move relative to the other for the purposes as described.

8. In a machine of the character described, a flat cylindrical drum for supporting a flat cylindrical edge portion of tire casing material and its accompanying bead ring, from the interior side thereof, and means adjacent the outer circumference of the drum for guiding the bead ring, said drum being mounted for rotation whereby the said guiding means will move relative to the drum circumferentially thereabout.

9. A machine for forming a multi-ply flat pulley band comprising a source of material supply, a rotatably mounted support having an outer contractible cylindrical wall for applying the material in the form of a flat band directly thereupon, said wall being formed flat transversely for a width sufficient to support the bead portions of the flat band upon its flat outer circumference, a reel frictionally driven by mutual rotatable rolling engagement with the said support, and means adapted to contract the cylindrical wall from its band-building position while the band is supported thereon.

10. In a machine of the character described, a flat cylindrical drum for supporting upon its outer flat cylindrical surface a flat endless edge portion of tire casing material and its accompanying bead ring, a frame revolubly supporting the drum, and a guide for the ring secured to the frame to be moved into and out of operable position adjacent the outer circumferential surface of the drum.

11. In a machine of the character described, a revolubly mounted drum for supporting the flat endless edge portions of tire casing material and their accompanying bead rings, guiding means adapted to simultaneously position the rings, and means for adjusting the guiding means relative to each other.

12. In a machine of the character described, a cylindrical drum for supporting a flat endless edge portion of tire casing material and its accompanying bead ring, a guide for the ring adjacent the outer circumference of the drum, and means for contracting the drum to enable the ring to be placed thereon and for expanding the drum to cause the ring to be pressed against the said material after the ring has been positioned preliminary to shaping the edge of the casing.

13. In a machine of the character described, a source of material supply, a flat cylindrical drum, means for expanding and contracting the drum, bead positioning guides adjacent the outer circumference of the drum, and means for conveying the material from the source to the drum.

Signed at New York city, New York, the 19th day of April, 1918.

ERNEST HOPKINSON.